Nov. 22, 1966  C. S. BROWN  3,286,620
ELECTRIC COOKER WITH HEATED ROCK BEDS
Filed Aug. 10, 1964
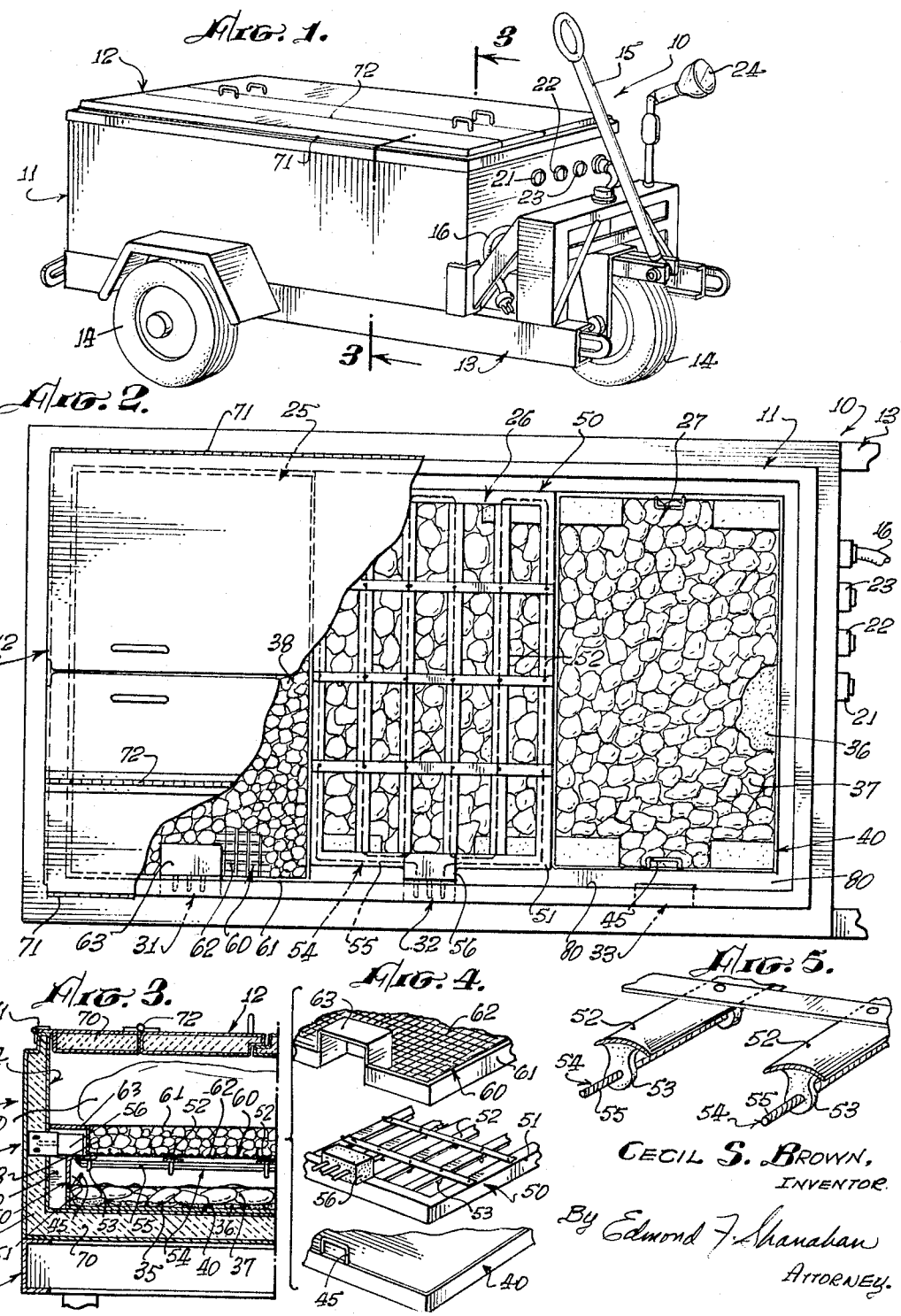

United States Patent Office 3,286,620
Patented Nov. 22, 1966

3,286,620
ELECTRIC COOKER WITH HEATED ROCK BEDS
Cecil S. Brown, 437 E. 127th St., Los Angeles, Calif.
Filed Aug. 10, 1964, Ser. No. 388,449
5 Claims. (Cl. 99—446)

This invention relates generally to electric cookers of the type in which most of the cooking is achieved by means of stored heat after the electricity has been turned off. More particularly, this invention relates to a cooker in which, inside an insulated chamber, meat or other food is cooked and drained on a bed of small rocks, which is supported on a combination screen and grill, under which large heat storage rocks are heated by a grid of electric heating elements, which are shielded from grease or other juices descending from the cooking food by the supporting grill work.

In its preferred form, the cooker is in the form of a wheeled vehicle which may be supplied with its cooking heat at a starting location by connection to an electrical outlet for a preliminary heat-up period, and subsequently moved to another location, where no electric heat is available while the food is cooking inside by virtue of the heat stored in the beds of rock above and below the heating elements.

Polynesian cooking has achieved world-wide fame for the subtle flavor imparted to meat, vegetables, and fruits cooked while entirely enclosed within layers of heated volcanic rock. The delicious flavors produced are subtly different from flavors produced by any other means of cooking, as by charcoal broiling, or roasting in a gas or electric oven. The rocks begin the cooking time at a searing temperature, but gradually decline in temperature at a slow rate while continuing to cook. Moreover, grease or liquids escaping from the cooking food tend to flow away between the rocks and escape into the earth or sand in which the rocks are usually buried, thus eliminating the problem of smokiness and grease vaporization which usually attend other forms of broiling fatty meats and the like. Polynesian cooking, such as that found in Hawaii, Samoa, and other Polynesian islands, is particularly suited to cooking entire hog or beef carcasses, together with fruit, vegetables, bread, and pastry, all cooked simultaneously in the same large bed of heated rock.

Unfortunately, the traditional method of Polynesian cooking, involving the digging of a large hole in the ground or beach, and heating a large pile of rocks on an open fire, calls for much labor and skill, and for other reasons also, is not practical to be used in the usual surroundings of a large city, or at the location of a crowded public beach or campground.

Attempts to duplicate the Polynesian type of cooking with an ordinary gas or electric oven, merely by partially filling it with pieces of volcanic rock, have either failed to produce the same flavor results, or have resulted in costly damage to the oven.

Although other heat-impervious rock may be substituted for the preferred and traditional volcanic ash rock, all such rocks tend to shed enough sandy granules during heating and use to clog or damage both gas and electric burners. Moreover, the grease and juice run-off inherent in Polynesian cooking, either ruins the burners or electric heating elements of most stoves, or makes them extremely difficult to clean.

If one attempts to solve the problem by isolation between the heat source and the rocks, the results are usually unsatisfactory. It appears essential for efficient and effective heating that the heat source be enclosed within the bed of rocks itself; also this comes closest to simulating the Polynesian system in which the rocks are first heated very hot, and then handled while preparing the cooking hole, but not during cooking.

The foregoing difficulties are overcome in the present invention by employing a system of electric elements between two layers of volcanic or similar rocks disposed in the bottom of an insulated cooking housing. The construction is such that descending liquids do not damage the electric heaters. Moreover, the different levels are supported in a series of trays or grids, one above the other, so that the assembly can be readily disassembled for cleaning.

The foregoing and many other objects and advantages of the invention will be best understood from the following description of one preferred specific embodiment, which embodiment is illustrated in detail in the accompanying drawings, in which:

FIGURE 1 is a perspective view of a traveling cooker constructed according to the invention, as seen from the right front corner of the vehicle;

FIGURE 2 is a plan elevational view of the oven or cooker of the device of FIGURE 1, with the cover partly broken away, and the three interior sections shown with successively deeper removal of component parts for purposes of illustration;

FIGURE 3 is a transverse sectional view, taken at a vertical plane indicated by the numerals 3—3 in FIGURE 1, but showing only the part of the section to the left of the vertical center line of the oven, looking rearward;

FIGURE 4 is a perspective view of corner fragments from each of three levels of the assembly within the oven of FIGURE 2; and, FIGURE 5 is an enlarged detail, seen in perspective of the electrical heater element of the device of FIGURES 1 to 4.

In the perspective view of FIGURE 1, the movable cooker is indicated generally by the numeral 10, and is seen to be comprised of a large oven 11, with a cover 12, all mounted on a vehicle chassis 13, which is rollably transported on wheels 14. The vehicle may be towed or pulled by a steerable front pull bar 15.

Electrical connection is provided by means of an electrical extension cord 16, which extends from the front of the oven 11, and should be plugged into a high capacity 220-volt alternating current outlet. Preferably, three different heat controls 21, 22, and 23 are provided on the exterior wall of the oven 11, for independently controlling three different interior sections of the oven, as will be described hereinafter. An incidental electrical convenience, which may be included in the wiring of oven 11, is a light 24 for illuminating the cooker 10 during night use.

The plan view of FIGURE 2 shows that although the interior of the cooker need not be partitioned by vertical partitions, three different sets of cooking conditions can be achieved in three separately controllable volumes within oven 11, designated generally in FIGURE 2 by the arrows 25, 26, and 27. For each of these volumes, heating electricity is separately supplied through electrical receptacles 31, 32, and 33 located on the interior left side wall 34, each separately controllable by controls 21, 22, and 23.

Inside the oven 11, as may be seen from the plan view of FIGURE 2 in the transverse sectional view of FIGURE 3, the principal mechanical components assembled one above the other, are, beginning next to the bottom 35 of the oven 11, a drip tray 40, an electric heater grill 50, and a screen tray 60.

The drip tray 40, a corner of which is shown in perspective in the lower part of FIGURE 4, is simply a shallow metal pan, and is covered with a layer of an inch or so of sand 36, upon which are laid a bed of large cobblestone-size lava rocks 37 or similar rocks.

The electric heater 50, details of which are seen in the fragmentary perspectives of FIGURE 4 and FIGURE 5, is comprised of a strong metal frame 51, grill bars 52, insulating supporters 53 attached to the undersides of the grill bars 52, a grid 54 comprised of a number of heating elements 55, which are connected to an electrical plug means 56. It will be noted that the grill bars 52 are preferably concave upwards so as to best function as shields for the electrical elements 55, thus protecting them from grease or other drippings descending from the cooking food above. Also, it will be noted that the electrical plug means 56, although integral with the frame 50 is offset from the frame upwardly and to the left, also for protective shielding reasons, as will appear hereinafter.

The screen tray 60 is comprised of a rectangular screen frame 61, a strong mesh screen bottom 62, and a protective housing construction 63, which, after assembly, extends over the electrical connection between electrical plug 56 and the receptacles 31, 32, and 33, fitting flush with sidewall 34 to prevent the electrical connection from being interfered with by drippings or the penetration of particles of rock or sand.

It will be seen from FIGURES 2 and 3 that screen tray 60 is filled with volcanic rock pebbles 38, which are sufficiently large not to pass through the mesh of screen 62, but are so small that, while permitting the downward passage of drippings, they provide a relatively flat bed for supporting cooking food 39 in the upper interior of the oven 11. Also, the food is shielded from charring by direct rays, on an oblique angle, from the red hot electrical elements 55. Also, some types of food, pork, for instance, may emit jets of fat during cooking, which would penetrate to the elements 55 if it were not for the bed of pebbles 38.

Preferably, the oven 11 and the top 12 are made of double-walled construction, as seen in the sectional view of FIGURE 3, with the wall interior filled with a heat-insulating material 70, such as Fiberglas wall. It will be seen that the cover 12 is constructed with hinged attachment 71 to the oven 11. Also, it is desirable to have at least one-half of the cover 12 provided with an additional hinge 72 so that cooking food may be inspected with a minimum amount of heat loss, by opening only a portion of the cover 12.

Another preferred feature of construction of the embodiment of the invention illustrated in FIGURES 1 to 5, is that the three screen trays 60 are supported at an intermediate elevation in the interior of the cooker 11 on an interior wall shoulder 80, which extends around the entire circumference of the lower part of the interior of the oven 11. The drip tray 40 and the electric heater grill 50 are smaller in horizontal dimension than the screen tray 60 and nest within the sidewalls 80. This facilitates electric plugging and unplugging, and also makes it easier to remove lower elements 40 and 50 for cleaning.

It will be seen that the cooker 10 can be connected to an electric outlet at a home or restaurant kitchen location specially provided to accommodate it and locate it at some central common starting point. After an hour or two of heating, the large rocks 37 and the small rocks 38 are glowing with stored heat, as in the Polynesian cooking system. Food 39 is then placed in position. Since there are three different sections inside the oven 25, 26, and 27, the duration of electrical heating and the placement of the food can be timed differently.

After the food is in place, the cooker 10 is then coupled behind a truck and towed to a beach or park or other home location thirty or forty miles away. No electrical connection is required subsequent to the initial heating, since the stored heat, mostly in the large rocks 37 will provide cooking at a descending temperature for three to ten hours after disconnection of the electricity. It will be appreciated that the different sizes of rock layers 37 and 38 are dictated by their different functions. The large rocks 37 are the principal containers of the stored heat, since their small ratio of surface to volume best serves this purpose. The small rocks 38 provide some heat storage, but they also serve as a filter bed, and even distributor of the heat to the food, without any local hot spots, as might be the case if the food rested on large rocks 37.

When the oven has been used several times, there may be sufficient accumulation of grease, etc. to necessitate cleaning. The covers 12 are turned back, the screen tray is manually lifted, its pebbles 38 are dumped and washed. Electric heaters 50 are unplugged, lifted out, cleaned, and the electric elements 55 inspected. Last, the large rocks 37 are removed and washed and the drip trays 40 are lifted out, preferably by handles 45 conveniently provided for that purpose.

While I have described one specific embodiment of my invention in great detail, it is not my intention to limit the invention to that form only, and I claim as my invention any modification or variation which is comprehended within the following claims.

What is claimed is:

1. An electric cooker for cooking food after shut-off of electricity, which cooker includes:
   an insulated oven;
   electrical receptacle means disposed at an intermediate elevation on the interior wall of said oven;
   electrical connection and control means on the exterior of said oven for controlling the electricity to said receptacle;
   an electric heater for connection to said receptacle, said heater comprising a grid of electric heating elements disposed in a horizontal plane, grill work bars in the form of strips of overhead shielding above each of the elements of said grid, and insulating means for supporting said elements under said overhead shielding strips to protect said elements from descending liquids;
   an electric plug means integral with said grill to provide electric connection of said heating elements to said receptacle;
   a screen-bottom tray supported above said grill, and a bed of heat resistant rock supported on said screen-tray, said bed being comprised of rock particles coarse enough not to pass through said screen, but small enough to provide a substantially level layer for support of cooking food, said layer being pervious to descending liquids but impenetrable to direct radiation from said electric grill;
   an electrial connection housing integral with said screen tray for shielding said electrical connection;
   and a drip tray below said electric grill, said drip tray containing heat impervious rocks substantially larger in size than the rocks comprising said layer above said grill.

2. An electric cooker for cooking food by heat storage, which cooker includes:
   an insulated oven;
   an electrical receptacle disposed at an intermediate elevation on the interior wall of said oven;
   electrical connection and control means on the exterior of said oven for controlling the electricity to said receptacle;
   an electric heater for connection to said receptacle, said heater comprising a grid of electric heating elements disposed in a horizontal plane below the elevation of said receptacle, grill work bars in the form of strips of overhead shielding above each of the element of said grid, and insulating means for supporting said elements under said overhead shielding strips to protect said elements from descending liquids;
   an electric plug means integral with said grill but disposed on the upper surface thereof so as to place electric connection to said receptacle above the elevation of said grill;

a screen-bottom tray supported above said grill, and a bed of heat resistant rock supported on said screen-tray, said bed being comprised of rock particles coarse enough not to pass through said screen, but small enough to provide a substantially level layer for support of cooking food, said layer being pervious to descending liquids but impenetrable to direct radiation from said electric grill;

an electrical connection housing integral with said screen tray for providing a shielded enclosure for said electrical connection above the elevation of said grill;

and a drip tray below said electric grill, said drip tray containing heat impervious rocks substantially larger in size than the rocks comprising said layer above said grill.

3. An electric cooker for cooking several food portions simultaneously within the same oven housing, at different rates, by stored heat, which cooker includes:

an insulated oven;

a plurality of electrical receptacles disposed at an intermediate elevation along the interior wall of said oven;

electrical connection means and a plurality of electric controls on the exterior of said oven for separately controlling the electricity to each of said receptacles;

a plurality of electric heaters for connection to said receptacles, each of said heaters comprising a grid of electric heating elements disposed in a horizontal plane below the elevation of said receptacles, grill work bars in the form of strips of overhead shielding above each of the elements of said grid, and insulating means for supporting said elements under said overhead shielding strips to protect said elements from descending liquids;

an electric plug means integral with each of said grills but disposed on the upper surface thereof so as to place electric connection to said receptacles above the elevation of said grill;

a screen-bottom tray supported on each of said grills, and a bed of heat resistant rock supported on said screen-tray, said bed being comprised of rock particles coarse enough not to pass through said screen, but small enough to provide a substantially level layer for support of cooking food, said layer being pervious to said descending liquids but impenetrable to direct radiation from said electric grill;

an electrical connection housing integral with each of said screen trays for enclosing each electrical connection between said electric plug means and said wall receptacle means;

and a drip tray below each of said electric grills, each of said drip trays containing heat impervious rocks substantially larger in size than the rocks comprising said layer above said grill.

4. An electric cooker for cooking several food portions simultaneously within the same oven housing, at different rates, by stored heat, which cooker includes:

an insulated oven, having a top opening;

removable insulated cover means for covering the top of said oven;

interior side walls of increased thickness enclosing the lower part of said oven to form a heat storage chamber of enlarged wall thickness and to provide a peripheral shoulder at an intermediate elevation within said oven;

a plurality of electrical receptacles disposed along the interior wall of said oven above said peripheral shoulder;

electrical connection means and a plurality of electric controls on the exterior of said oven for separately controlling the electricity to each of said receptacles;

a plurality of electric heaters, upwardly liftable through said top opening, for connection to said receptacles, each of said heaters comprising a grid of electric heating elements disposed in a horizontal plane below the elevation of said peripheral shoulder, grill work bars in the form of strips of overhead shielding above each of the elements of said grid, and insulating means for supporting said elements under said overhead shielding strips to protect said elements from descending liquids;

an electric plug means integral with each of said grills but projecting upwardly to the elevation of said receptacles;

a screen-bottom tray upwardly liftable through said top opening and supported on each of said grills, and a bed of heat resistant rock supported on said screen-tray, said screen tray being comprised of rock particles coarse enough not to pass through said screen, but small enough to provide a substantially level layer for support of cooking food, said layer being pervious to descending liquids but impenetrable to direct radiation from said electric grill;

an electrical connection housing integral with each of said screen trays for enclosing each electrical connection between said electric plug means and said wall receptacle means;

and a drip tray below each of said electric grills and liftable from said oven through said top opening, each of said drip trays containing heat impervious rocks substantially larger in size than the rocks comprising said layer above said grill.

5. A movable electric cooker for cooking large food portions simultaneously within the same housing at different rates while said cooker is being transported, which cooker includes:

a transport vehicle;

an insulated oven, having a top opening, mounted on said vehicle;

removable insulated cover means for covering the top of said oven;

a plurality of electrical receptacles disposed at an intermediate elevation along the interior wall of said oven;

electrical connection means and a plurality of electric controls on the exterior of said oven for separately controlling the electricity to each of said receptacles;

a plurality of electric heaters for connection to said receptacles, each of said heaters comprising a grid of electric heating elements disposed in a horizontal plane below the elevation of said receptacles, grille work bars in the form of strips of overhead shielding above each of the elements of said grid, and insulating means for supporting said elements under said overhead shielding strips to protect said elements from descending liquids;

an electric plug means integral with each of said grilles but disposed on the upper surface thereof so as to place electric connection to said receptacles above the elevation of said grille;

a screen-bottom tray supported on each of said grilles, and a bed of heat resistant rock supported on said screen-tray, said bed being comprised of rock particles coarse enough not to pass through said screen, but small enough to provide a substantially level layer for support of cooking food, said layer being pervious to descending liquids but impenetrable to direct radiation from said electric grille;

an electrical connection housing integral with each of said screen trays for enclosing each electrical connection between said electric plug means and said wall receptacle means;

a drip tray below each of said electric grilles, each of said drip trays containing heat impervious rocks substantially larger in size that the rocks comprising said layer above said grille;

and a bed of sand in said drip tray for absorbing liquids descending from cooking food.

References Cited by the Examiner

UNITED STATES PATENTS

| | | | |
|---|---|---|---|
| D. 145,897 | 11/1946 | Hathaway. | |
| 2,626,559 | 1/1953 | Rau | 99—446 X |
| 2,654,018 | 9/1953 | Sandberg | 219—378 |
| 2,790,434 | 4/1957 | Del Francia. | |
| 2,898,846 | 8/1959 | Del Francia | 99—444 X |
| 2,905,077 | 9/1959 | Del Francia | 99—446 |
| 3,098,427 | 7/1963 | Del Francia | 99—446 |
| 3,173,357 | 3/1965 | Nunnery | 99—446 X |

WALTER A. SCHEEL, *Primary Examiner.*

S. P. FISHER, *Assistant Examiner.*